United States Patent [19]

Matsumoto

[11] 4,297,414
[45] Oct. 27, 1981

[54] REINFORCING MATERIAL FOR HYDRAULIC SUBSTANCES AND METHOD FOR THE PRODUCTION THEREOF

[75] Inventor: Hisashi Matsumoto, Iwakuni, Japan

[73] Assignee: Mitsui Petrochemical Industries, Ltd., Tokyo, Japan

[21] Appl. No.: 51,387

[22] Filed: Jun. 25, 1979

[30] Foreign Application Priority Data

Jul. 7, 1978 [JP] Japan ................................. 53-81917
Jul. 17, 1978 [JP] Japan ................................. 53-86182
Dec. 20, 1978 [JP] Japan ................................. 53-160804

[51] Int. Cl.³ ............................................. D02G 3/00
[52] U.S. Cl. .................................... 428/400; 52/659; 264/177 F; 428/399
[58] Field of Search ............... 428/399, 400, 364, 397; 525/108, 122, 240; 264/177 F, 177 R; 52/659, 737, 738, 739, DIG. 7

[56] References Cited

U.S. PATENT DOCUMENTS

| 2,940,888 | 6/1960 | Johnson | 525/122 X |
| 3,127,915 | 4/1964 | Bottomley | 428/399 X |
| 3,167,882 | 2/1965 | Abbott | 428/399 X |
| 3,329,998 | 7/1967 | Stohr | 264/177 F |
| 3,330,187 | 7/1967 | Kohler et al. | 264/177 R |
| 3,393,083 | 7/1968 | Yukichi Go | 428/400 X |
| 3,478,131 | 11/1969 | Wharton et al. | 428/349 X |
| 3,489,626 | 1/1970 | Rubenstein | 52/DIG. 7 |
| 3,526,569 | 9/1970 | Chopra et al. | 428/394 X |
| 3,645,961 | 2/1972 | Goldfein | 52/659 X |
| 3,928,519 | 12/1975 | Kashiyama et al. | 428/399 X |
| 3,953,953 | 5/1976 | Marsden | 428/399 X |
| 4,001,366 | 1/1977 | Brumlik | 264/177 F |
| 4,133,928 | 1/1979 | Riley et al. | 52/659 X |

FOREIGN PATENT DOCUMENTS

45-30650 10/1970 Japan ................................. 428/399

Primary Examiner—Lorraine T. Kendell
Attorney, Agent, or Firm—Oblon, Fisher, Spivak, McClelland & Maier

[57] ABSTRACT

A reinforcing material for hydraulic substances such as cement, mortar, concrete or the like consists essentially of an elongated product of a synthetic resin having protrusions on its surface and which was obtained by extruding and subsequent stretching. The material produced by a method comprising mixing a polyethylene having a melt index of not more than 0.01 at 190° C. under a load of 2.16 Kg with a polyethylene having a melt index of more than 0.01 thereby to obtain a polyethylene mixture having a melt index of 0.01 to 10, melt-extruding the polyethylene mixture under such conditions as to give an extruded product having a jagged surface and stretching the extruded product, whereby the reinforcing material having protrusions on its surface is obtained. Hydraulic substances with the reinforcing material incorporated therein are useful for production of concrete panels, concrete pipe, concrete channels, tetrapods, sleepers, tunnels, etc.

15 Claims, 33 Drawing Figures

REINFORCING MATERIAL FOR HYDRAULIC SUBSTANCES AND METHOD FOR THE PRODUCTION THEREOF

BACKGROUND OF THE INVENTION

This invention relates to a reinforcing material to be incorporated into a hydraulic substance as cement, mortar, concrete, gypsum or clay, and a method for producing it.

Heretofore, it has been proposed to incorporate into a cement material a reinforcing material such as steel fiber, glass fiber, polypropylene fiber or split yarn to improve the physical properties, such as tensile strength, bending strength, impact strength and cracking strength, of the cement material.

However, in each of the fiber materials mentioned above, the fibers are entangled rather strongly with each other so that they are difficulty dispersible in concrete material, and accordingly the distribution of fibers in the concrete material tends to be uneven. Further, such fibers, especially the steel fibers and glass fibers, require the employment of a special fiber beater or mixer such as a fiber dispenser, Omni mixer (registered trade mark) or auger mixer. Further, the steel fibers have a poor anti-corrosive property and are readily corroded by the salt content in the sea sands. Glass fibers tend to thicken as their viscosity increases upon admixing and are thus likely to form an undesirable fiber ball even when they are fed after disentangling, and they are inferior in the cement alkali resistance property.

Further, conventional polypropylene fibers have a circular cross section and a smooth surface and therefore they are likely to slip out when a bending stress is exerted on the concrete material containing them, and the concrete material is likely to be cracked or destroyed, and therefore they do not provide sufficient reinforcement.

Further, the split yarns of a synthetic resin are fibers of a net like structure which suggests a good physical bondage of the fibers with the concrete material. However, actually they do not provide satisfactory reinforcement as they are mixed in a bent form in the concrete material. Further, the split yarns themselves are bulky and it is difficult to disperse uniformly in the cement material.

SUMMARY OF THE INVENTION

Thus, it is an object of the present invention to overcome the difficulties of the conventional fibers by improving the material and shape of the reinforcing material and thereby to improve the tensile strength, bending strength, impact strength, and cracking strength as well as chemical resistance and corrosion resistance of the hydraulic substances. A further object of the present invention is to provide a reinforcing material which can readily and homogeneously be incorporated into the hydraulic substances without using a special machine, and which thereby makes it possible for the hydraulic substances to maintain the tensile strength and bending strength and which enables to produce the hydraulic substances in a high workability.

It is another object of the invention to improve the formation of the reinforcing material thereby facilitating the production thereof.

A further object of the invention is to provide various reinforced products of hydraulic substances such as a reinforced mortar or concrete structure, or a reinforced concrete product by incorporating a suitable amount of the above-mentioned reinforcing material.

The reinforcing material for hydraulic substances according to the present invention, consists essentially of an elongated product of a synthetic resin having protrusions on its surface and stretched. Whereas, the method of the present invention comprises mixing a polyethylene having a melt index of not more than 0.01 with a polyethylene having a melt index of more than 0.01 thereby to obtain a polyethylene mixture having a melt index of 0.01 to 10, melt extruding the polyethylene mixture to yield an extruded product having a jagged surface, and stretching the extruded product.

The term "elongated" used for the synthetic resin product is intended to mean that the length of the product is greater than its diameter.

The synthetic resins to be used for the present invention may be any melt-shapable resins, and for instance, thermoplastic resins, thermoplastic resins mixed with various amounts of cross linking agents, hardeners or the like, or resins consisting of a mixture of a thermoplastic resin with a thermosetting resin, may be mentioned as the raw materials. More particularly the synthetic resins may be thermoplastic resins such as polyolefins, polyvinylchloride, polystyrene, polyvinylidene chloride, polymethyl methacrylate, polyacetal, polycarbonate, polyphenyleneoxide, polysulfone, polyimide, polyester and polyamide, or thermosetting resins such as diallyl phthalate, phenolic resins, epoxy resins, urea resins, melamine resins, unsaturated polyester resins and saturated polyester resins. Polyolefins or resins containing a polyolefin as the major constituent are particularly useful because of their availability at low cost the capability of being easily shaped.

Said polyolefins include, for instance, polymers and copolymers of 1-olefins such as ethylene, propylene, 1-butene, 1-pentene, 3-methyl-1-butene, 1-hexene, 4-methyl-1-pentene, 1-heptene, and 1-octene, or copolymers of these 1-olefins with a small amount of other polymerizable monomers such as vinyl acetate, acrylic acid, methacrylic acid, methyl acrylate, or methyl methacrylate, or graft copolymers obtained by grafting onto the above-mentioned polyolefins polymerizable monomers such as vinyl acetate, acrylic acid, methacrylic acid, maleic acid, fumaric acid, methyl acrylate, methyl methacrylate, methyl maleic acid, ethyl acrylate, ethyl methacrylate, ethyl maleic acid or maleic anhydride. Polymers having a high degree of crystallinity such as polyethylene, polypropylene, and poly-1-butene are preferred as they have high stiffness. Polyethylene, particularly a high density polyethylene having a density of 0.930 to 0.980 (g/cc) as measured based on ASTM D1505-63T, is especially preferred as it is capable of being easily shaped to have a jagged surface.

The above-mentioned synthetic resins may contain additives such as thermal stabilizers, weather-proofing agents, lubricants, slipping agents, dyestuffs, pigments, flame-proof agents, antistatic agents, fillers, cross linking agents, hardeners, or silane coupling agents.

In order to obtain the reinforcing material of the present invention from these resins, it is preferred to extrude the synthetic resins under such conditions as to give an extruded product having a jagged surface, to cool the extruded product and then to stretch the extruded product.

It is preferred to conduct the melt extrusion under such conditions as to produce a matted or shark skin i.e. rugged surface or melt fracture to ensure the attainment of the jagged surface.

Sometimes it happens that the jagged surface disappears during the subsequent stretching operation. In order to avoid this, it may be necessary to impress the jagged pattern distinctly on the extruded product by means of a special die.

By extruding synthetic resin under the above mentioned conditions in this invention, it is possible to readily produce, without use of special dies, an extruded product with protrusions which certainly remain during and after the stretching operation. In the conventional extrusion methods, such conditions have generally been avoided as being undesirable because they tend to give products of inferior value. Whereas, according to the present invention, these conditions are effectively utilized for forming a jagged surface and it is thereby possible to improve the efficiency in the continuous production of the reinforcing material.

The term "matted surface" signifies a jagged surface having relatively fine convexities and concavities, and the distance between the convexities is normally 0.1 mm or less. The "shark skin i.e. rugged surface" is meant for a jagged surface with a distance between the convexities more than 0.1 mm. The "melt fracture" signifies a jagged surface having a pitch of the convexities and concavities greater than that of the "rugged surface" and the convexities and concavities are not so sharp as those of the "rugged surface" and they are relatively smooth.

For the purposes of the present invention, it is preferred to utilize either the "rugged surface" or the "melt fracture". The melt fracture is most preferred but in order to have the protrusions retained during and after the stretching treatment, the convexities and concavities of the extruded product should be as sharp and deep as possible.

Any method of extrusion may be used so far as it is so conditioned as to give a product having a matted surface, rugged surface or melt fracture. For example, there is a method wherein a homogeneous mixture of two or more different kinds of synthetic resins is used as the starting raw material, a method wherein two or more different kinds of synthetic resins are extruded together while they are not yet completely mixed, a method wherein the melt extrusion is conducted at a temperature to give insufficient heat for the resin to be extruded, a method wherein a cross linking agent, unsaturated monomer or the like is added to the resin so as to cause a partial gelation, and a method wherein the discharge rate of the resin from the extruder is periodically changed. The extruded products are then cooled, for example in a water bath. By cooling the extruded product, they reach the crystalline state. After that they are subjected to the stretching treatment so as to be in an oriented state.

Preferred polyolefins to be used in an embodiment of the present invention are polyethylene which has a melt index (as measured based on ASTM D1238-65% at 190° C. under the load of 2.16 Kg, unit: g/10 min.) of 0.01 to 10. The polyethylene having high density, i.e. a density of 0.930 to 0.980 is preferred. In order to ensure the occurrence of melt frecture, it is preferred to use a polyethylene having a melt index of 0.01 to 10 which can be obtained by mixing a polyethylene having a melt index of not more than 0.01 and a polyethylene having a melt index of more than 0.01. Particularly preferred polyolefin is a mixture of a polyethylene having a melt index of more than 0.01 and not more than 1.0 in a proportion of 10 to 80% by weight, preferably 30 to 70% by weight, and of a polyethylene having a melt index of not more than 0.01, preferably 0.001 to 0.01. With these materials, the melt extrusion is conducted under such conditions as to give strands having a rugged surface or melt fracture. The convexities and concavities of the strands thus obtained are separated by short distances from each other and they are sharp and accordingly even after the stretching treatment, the state of the convexities and concavities in quite satisfactory.

In another embodiment of the present invention, a resin mixture of a polyolefin with a thermosetting resin is used. Said thermosetting resin may be an epoxy resin, diallyl phthalate resin, phenolic resin, urea resin, melamine resin, or unsaturated polyester resin. These resins may be used singly or as a mixture of two or more as the case requires. Epoxy resins are most preferred.

Said epoxy resins contain at least one epoxy group in a molecular chain and they may be, for instance, a polyglycidyl ether obtained by the reaction of an epihalohydrin such as epichlorohydrin, or dihalohydrin such as glycerol dichlorohydrin with a polyphenol such as 2,2-bis(4-hydroxyphenyl)propane (commonly called bisphenol-A), 2,4-hydroxydiphenylmethane, bis(2-hydroxyphenyl)methane, bis(4-hydroxyphenyl)methane (commonly called bisphenol-F), 1,1-bis(4-hydroxyphenyl)ethane, bis(4-hydroxy-2,6-dimethyl-3-methoxyphenyl)methane, resorcinol, hydroquinone, catechol, or nuclear substituted substances thereof or halides thereof, or another epoxy resin may be used. They are obtained by the reaction of an epihalohydrin or dihalohydrin with polyalkylene glycol such as ethylene glycol, polyoxyalkylene glycol such as diethylene glycol, other compounds containing hydroxy group, and polycarboxylic acid such as oxalic acid, Fumaric acid, maleic acid, etc.

Among these epoxy resins, polyglycidyl ethers of polyphenols are preferred. Particularly, glycidyl ethers of bisphenol-A, bisphenol-F and 1,1-bis(4-hydroxyphenyl)ethane having a viscosity at 25° C. of 100 to 15,000 cps and an epoxy equivalent of 300 to 5,000, are most preferred. Hardeners may be added if necessary.

The above-mentioned polyolefins are all useful for the second embodiment of the present invention. However, preferred polyolefins are a polypropylene having a melt index (as measured based on ASTM D1238-65T) at 230° C. of 0.1 to 20 or a polyethylene having a melt index at 190° C. of 0.01 to 40, particularly 0.01 to 10, especially a polyethylene having a melt index of 0.01 to 10 which is prepared by mixing a polyethylene having a melt index of not more than 0.01 with a polyethylene having a melt index of more than 0.01.

The thermosetting resin is added to a polyolefin in an amount of 0.1 to 50% by weight, preferably 3 to 30% by weight, whereby a satisfactory formation of the convexities and concavities is attained and an excellent reinforcement is accomplished. An amount less than 0.1% by weight does not provide a satisfactory effectiveness. An amount of more than 50% by weight does not add to the efficiency or sometimes adversely affects the efficiency.

Various conventional mixers, for instance, Henshel mixer, Banbury mixer roll and extruders may be used for mixing the two or more different resins of the above embodiment, and a master batch preliminarily prepared is also used.

Stretching treatment may be operated under the condition of causing the molecular orientation of the synthetic resin. When an polylefin is used as the synthetic resin, the stretching treatment should preferably be conducted at a temperature lower than the melting point and higher than the second order transition temperature of the polyolefin and at a stretching ratio of 2 to 20 times, preferably 6 to 12 times. Through this stretching treatment, a reinforcing material having high rigidity and low elongation property is obtained.

The reinforcing material should preferably have a thickness of 100 to 50,000 denier, particularly 3,000 to 12,000 denier, an initial modulus of elasticity (ASTM D638-64T) of 150 to 700 kg/mm$^2$, and an elongation at the breaking point of less than 30%.

The protrusions of the reinforcing material should preferably be 0.1 mm or more in height. The number, the shape of the tips or the direction of the protrusions is not critical. The protrusions should, however, be of a continuous or discontinuous jagged shape in their cross sections and should be inclined in irregular directions so that the slipping out of the reinforcing material from the hydraulic substance such as a cement layer may thereby effectively prevented.

The reinforcing material of the present invention may be incorporated into a hydraulic substance such as cement in various forms. For instance, it may be incorporated in the form of short stem fragments obtained by cutting the material into an appropriate length, in the form of string fragments obtained by cutting the material to a relatively large length, in the form of twisted string fragments like rope obtained by twisting strings of the small diameter together or in the form of a net obtained by weaving or knitting such strings.

The above mentioned short stem fragments of the reinforcing material should preferably be 5 to 100 mm, particularly 30 to 80 mm, in length and should preferably be incorporated into cement in an amount of 1 to 30% by weight, particularly 3 to 15% by weight, on the basis of the weight of the cement. An amount less than the lower limit does not provide a sufficient reinforcing effectiveness and an amount exceeding the upper limit makes the proportion of the reinforcing material too great to obtain uniform distribution of the material.

The reinforcing material of the present invention may be incorporated into hydraulic substances, for instance, hydraulic cements such as portland cement, white portland cement, alumina cement, silica cement, magnesia cement and pozzolanic cement, or air setting cements such as gypsum and lime, or a special cement such as acidproof cement, or various cement mortars, or inorganic materials such as calcium carbonate and magnesium hydroxide, or earth such as wall mud.

Further, the reinforcing material may be used in combination with other materials such as steel fibers, glass fibers, asbestos, and pulps.

The reinforcing material is also used for incorporation into the foamed concrete material which is obtainable by foaming. The concrete material may be mixed, if necessary, with paraffins, wax, thermosetting water soluble resins such as resol-type phenol resins, various polymer emulsions, hardening promoting agents or hardening suppressing agents.

Accordingly, the reinforcing material of the present invention may be incorporated into various inorganic materials or their mixtures with other materials.

The reinforcing material of the present invention may be incorporated into cement in such a manner that after mixing cement with necessary additives such as sands, silica or any other materials, the reinforcing material of the invention is admixed, and then water is admixed, and the mixture is allowed to solidify, or in such a manner that the cement and the necessary additives are first mixed with water and then the reinforcing material is added. The reinforcing material is added in an amount of 0.1 to 10% by volume, preferably 0.5 to 5% by volume or more preferably 1 to 3% by volume based on wet slurry.

The reinforcing material may be pretreated before use. For instance, it may be impregnated with a surface active agent, dispersing agent or resin emulsion. When treated with ethylene glycol, the reinforcing material will have an improved dispersibility into a water slurry.

The reinforcing material of the present invention has high rigidity and a less possibility of entanglement, and thus has an improved dispersibility into hydraulic substances such as cement. Accordingly, it is possible to thoroughly mix the reinforcing material with concrete by means of an ordinary mixer. The mixing operation is facilitated because it is unnecessary to use a beater or special apparatus which is usually required with conventional methods. The reinforcing material can uniformly be dispersed in the concrete without formation of fiber balls, thus giving a final product having a uniform distribution of the reinforcing material and no irregularity in strength. By virtue of the protrusions, the reinforcing material has an improved anti-slipping out strength against the bending stress exerted on the concrete material in which it is embedded. Accordingly, the bending strength, impact strength and cracking strength of the concrete material are thereby increased, and the falling off of edges of the concrete material is thereby minimized.

The hydraulic substances combined with the reinforcing material of the present invention may be used for runways, beams for bridges, tunnels, tetrapods, flat plates, corrugated Plates, thick slates, roof plates, asbestos slates, cement plates, pipes, Hume concrete pipes (Centrifugility-shaped reinforced concrete pipe), U-shaped beams, roof tiles or other tiles, floors, poles, sleepers, construction blocks, gypsum boards, benches, decorated plates such as terazzo or the like.

Further features and advantages of the present invention will be apparent from the following description of the preferred embodiments with reference to the accompanying drawings.

DETAILED DESCRIPTION OF THE INVENTION

Figure 1:
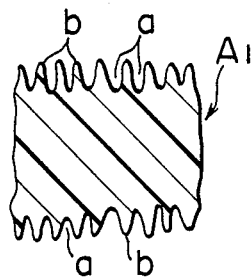
FIGS. 1 to 4 are cross sectional views of fragments of the extruded product before stretching.
Figure 2:
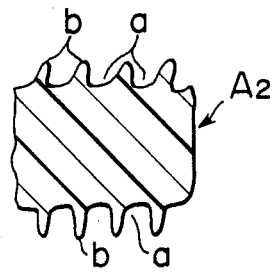
Figure 3:
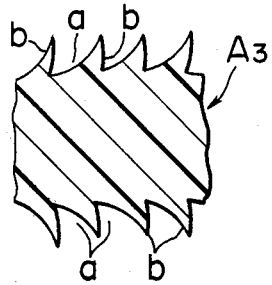
Figure 4:
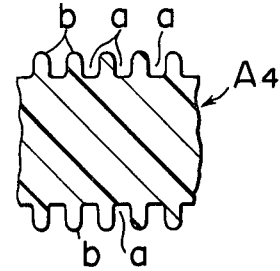
Figure 5:
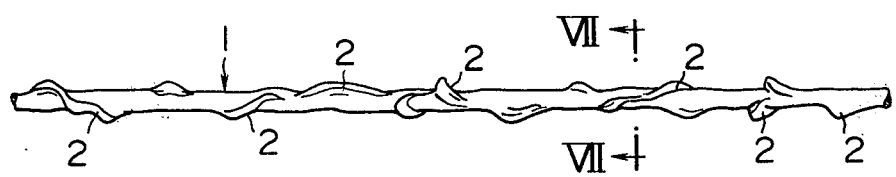
FIG. 5 is a perspective view of the reinforcing material obtained by stretching the extruded product.
Figure 6:
FIG. 6 is a longitudinal cross sectional view of the reinforcing material.
Figure 7:
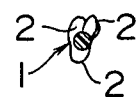
FIG. 7 is a cross section taken along line VII—VII of FIG. 5.
Figure 8:
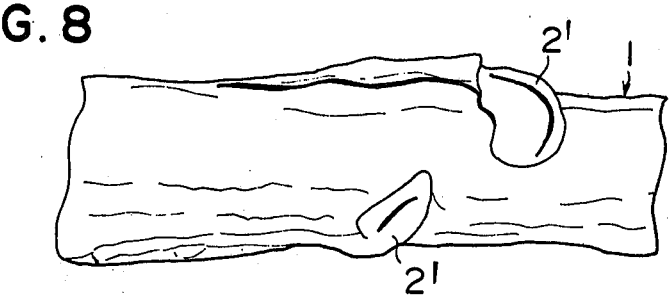
FIGS. 8 to 19 are partial views illustrating various modifications of the protrusions of the reinforcing material.
Figure 9:
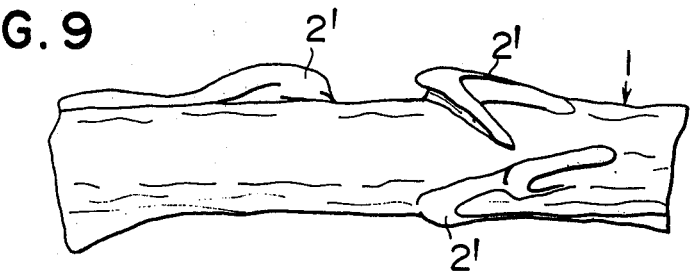
Figure 10:
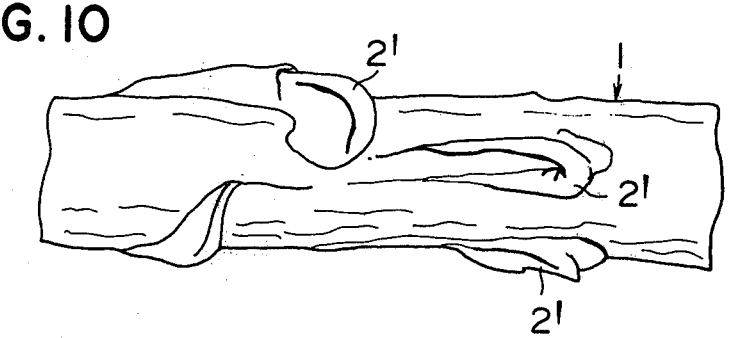
Figure 11:
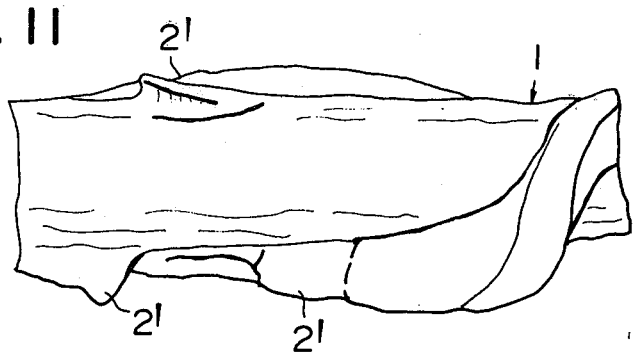
Figure 12:
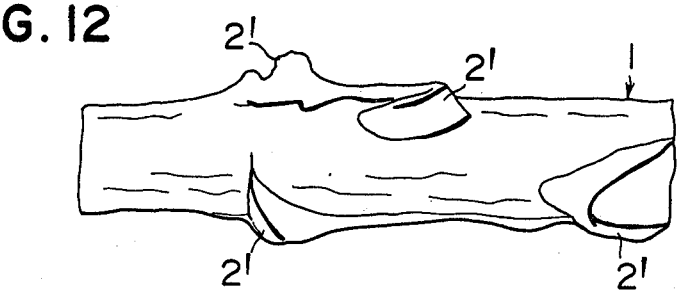
Figure 13:
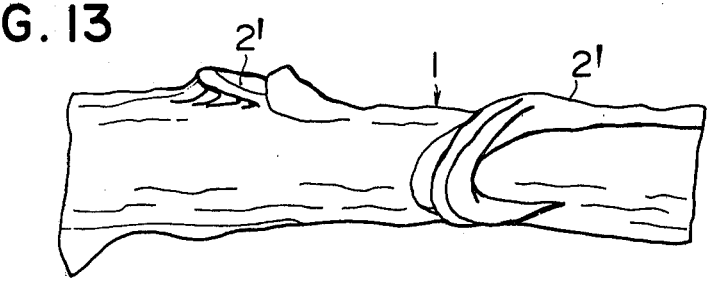
Figure 14:
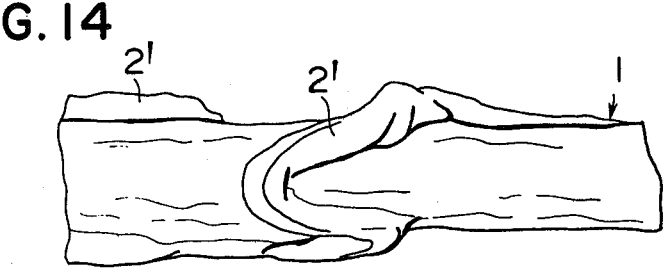
Figure 15:
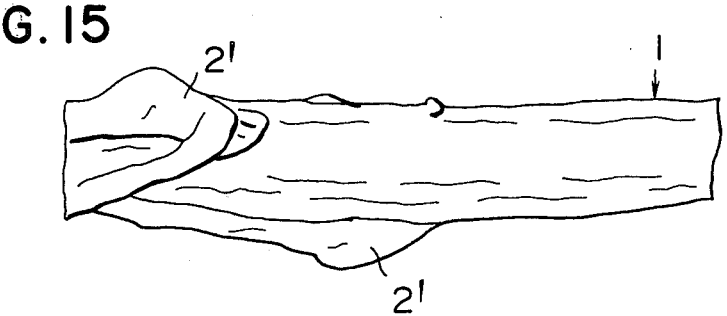
Figure 16:
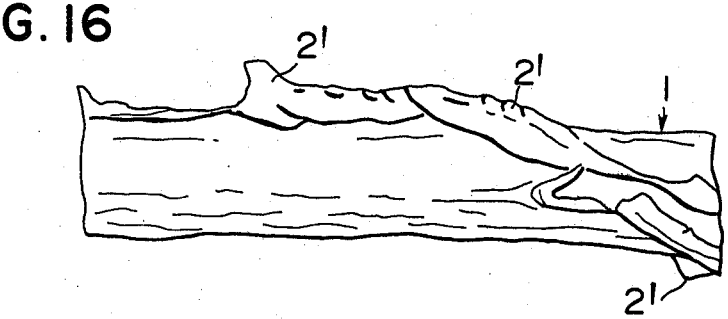
Figure 17:
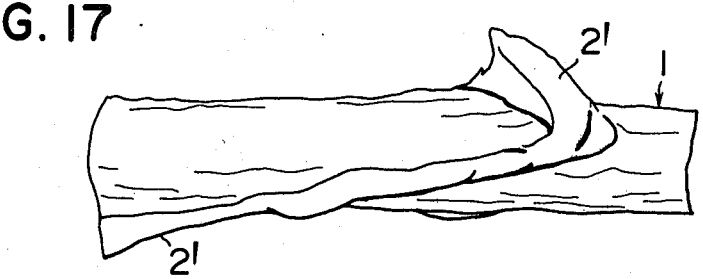
Figure 18:
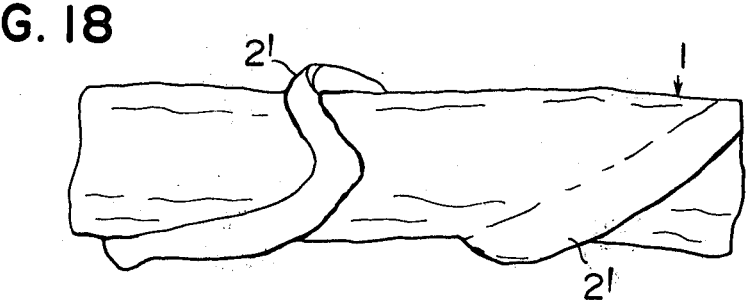
Figure 19:
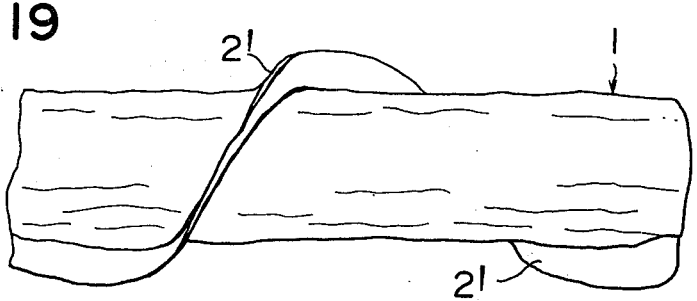

Examples 1 to 6 and Comparative Example

Preparation of Reinforcing Material

A homogeneous mixture of 40 parts by weight of a polyethylene having a melt index of 0.04 (Hizex (trademark) 7000 F by Mitsui Petrochemical Industries, Ltd.) and 60 parts by weight of a polyethylene having a melt index of not more than 0.01 (Hizex MILLION (trademark) 145 M by Mitsui Petrochemical Industries, Ltd.) is fed to an extruder and extruded at a resin temperature of 220° to 250° C. under a pressure of 150 to 220 Kg/cm$^2$ through a nozzle having six orifices whose diameters are each 2.5 mm, under the shear rate 8 sec$^{-1}$ and the extruded strands thus obtained are cooled in water bath and stretched at 120° C. eight times to give string materials of 5000 denier (Sample 1). Concavities and convexities were formed on the Sample 1 when it was extruded from the orifice, and its protrusions still remained after the stretching treatment. The string has an average diameter of about 1.32 mm, including the protrusions, and an average diameter of about 0.7 mm, excluding the protrusions, and there are four protrusions over the length of 30 mm of the string. Each protrusion has a length of about 1 mm on average. Sample 1 had an initial modulus of elasticity of 200 Kg/mm$^2$, an elongation at the breaking point of 10% and tensile strength 2700 Kg/mm$^2$.

Whereas, a polyethylene having a melt index of 4 (Hizex (trademark) 5000 S by Mitsui Petrochemical Industries, Ltd.) was extruded at a resin temperature of 160° to 200° C. through the same nozzle, whereupon the extruded filaments had relatively smooth concavities and convexities on their surface. When stretched 4 times, the filaments still retained the protrusions. However, when stretched 8 times, the protrusions of Sample 6 disappeared.

Other resins were also extruded in a similar manner and the results are presented in Table 1.

Preparation of Test Samples 100 parts by weight of portland cement and 200 parts by weight of standard sands were thoroughly mixed and then added with the reinforcing material obtained by the above-mentioned examples in the proportions as shown in Table 2. After thorough mixing, about 65 parts by weight of water was added, and the mixture was further mixed to obtain a uniform composition. The mixture was poured in mold frames of 40 mm×40 mm×160 mm left for 24 hours in the air and for 6 days in water, thus a total of seven days for setting to form concrete material.

Measurement of Bending Strength

The test samples obtained by the above method tested for bending strength by means of Instron universal tension tester with a span of 100 mm, at a bending rate of 1 mm/min, and with a bending tool tip curvature of 5 R.

The test results are presented in Table 2.

TABLE 1

| | Composition of Reinforcing Material | | | | | | | | Nature of Reinforcing material | | Physical Properties of Reinforcing Material | | |
|---|---|---|---|---|---|---|---|---|---|---|---|---|---|
| | Polyethylene*[1] | | Polyethylene | | Epoxy resin | | | | | | Initial | | |
| Samples | Melt Index (g/10 min) | Amount (parts by weight) | Melt Index (g/10 min) | Amount (parts by weight) | Epoxy equiv-alent | Vis-cosity (cps) | Amount (parts by weight) | | Stretching Ratio (times) | Thickness (denier) | Modulus of Elasticity (Kg/mm$^2$) | Strength (g/denier) | Elongation (%) |
| Sample 1 | 0.04 | 40 | 0.01 or less | 60*[2] | — | — | — | | 7.0 | 4500 | 200 | 2.5 | 10 |
| Sample 2 | 0.04 | 50 | 0.01 or less | 50*[3] | — | — | — | | 8.0 | 3400 | 260 | 3.5 | 10 |
| Sample 3 | 0.04 | 50 | 0.01 or less | 45*[3] | 4000 | 12500 | 5*[4] | | 8.0 | 6000 | 200 | 2.8 | 10 |
| Sample 4 | 0.04 | 45 | 0.01 or less | 50*[2] | 4000 | 12500 | 5*[4] | | 8.0 | 7100 | 240 | 2.4 | 15 |
| Sample 5 | 0.04 | 40 | 0.01 or less | 60*[2] | — | — | — | | 3.0 | 9800 | 110 | 1.1 | 25 |
| Sample 6 | 0.04 | 100 | — | — | — | — | — | | 8.0 | 4400 | 290 | 4.6 | 15 |

| | density: | Melting point: | *Average Molecular weight measured by viscosity method |
|---|---|---|---|
| *[1]Hizex (registered trademark) 7000 F by Mitsui Petrochemical Industries, Ltd. (High density polyethylene) | 0.955 g/cc | 130° C. | 120,000 |
| *[2]Hizex MILLION (registered trade mark) 145 M by Mitsui Petrochemical Industries, Ltd. (High density polyethylene) | 0.945 g/cc | 136° C. | 500,000 |
| *[3]Hizex MILLION (registered trademark) 240 M by Mitsui Petrochemical Industries, Ltd. (High density polyethylene) | 0.940 g/cc | 136° C. | 1,000,000 |
| *[4]EPOMIK (registered trademark) R-309 by MPI Epoxy Corporation | | | |

TABLE 2

| | | Reinforcing Material for Cement | | | Bending strength of concrete material (Kg/cm$^2$) |
|---|---|---|---|---|---|
| Examples | Samples | Convexities and concavities on the surface | Length (mm) | Amount (parts by weight) | |
| Example 1 | Sample 1 | Yes | 40 | 10 | 150 |
| Example 2 | Sample 2 | Yes | 40 | 15 | 150 |
| Example 3 | Sample 3 | Yes | 40 | 10 | 210 |
| Example 4 | Sample 3 | Yes | 60 | 8 | 145 |
| Example 5 | Sample 4 | Yes | 40 | 10 | 185 |
| Example 6 | Sample 5 | Yes | 40 | 15 | 110 |

TABLE 2-continued

| Examples | Samples | Reinforcing Material for Cement | | | Bending strength of concrete material (Kg/cm²) |
|---|---|---|---|---|---|
| | | Convexities and concavities on the surface | Length (mm) | Amount (parts by weight) | |
| Comparative Example | Sample 6 | No | 40 | 10 | 72 |

Referring to FIGS. 1 to 4, A₁ to A₄ are the extruded products of synthetic resins obtained immediately after the melt extrusion and prior to stretching treatment, and each of the products A₁ to A₄ has on its surface alternately continuous concavities (a) and convexities (b).

The reinforcing material 1 is an elongated product of a synthetic resin obtained by stretching the products A₁ to A₄ and it still retains the protrusions 2, 2 on its surface even after the stretching. The protrusions 2, 2 are remnants of the convexities (b) of the extruded product which have been stretched regularly or irregularly and deformed through the stretching treatment, and yet maintain their protruded state.

The protruions 2 take various forms such as mountain-shaped, serrated or spiral-shaped forms depending upon the nature of the synthetic resins to be used, the shapes of the concavities and convexities of the extruded product or the method for stretching, and the modifications in the form of the protrusions are shown in FIGS. 8 to 19. FIGS. 8 to 19 show fragments of the reinforcing material as enlarged 20 times. In each Fig., 1 is the reinforcing material and 2' is a protrusion. The reinforcing material 1 shown in FIGS. 8 and 10 has a thickness of 8,500 denier, and the reinforcing material 1 shown in FIGS. 9 and 11 to 19 has a thickness of 3,400 denier.

Figure 20:
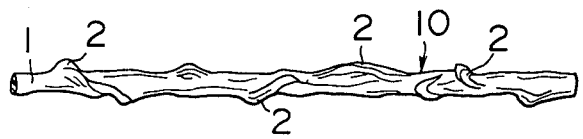
FIG. 20 is a perspective view illustrating a short stem fragment of the reinforcing material.
Figure 21:
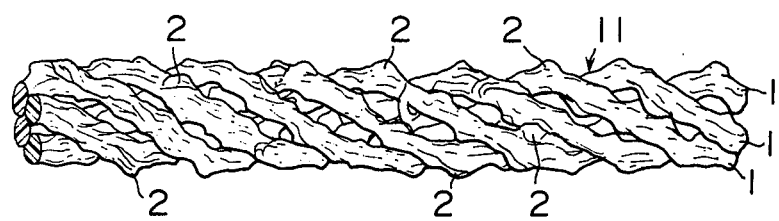
FIG. 21 is a perspective view illustrating twisted string fragment of the reinforcing material.
Figure 22:
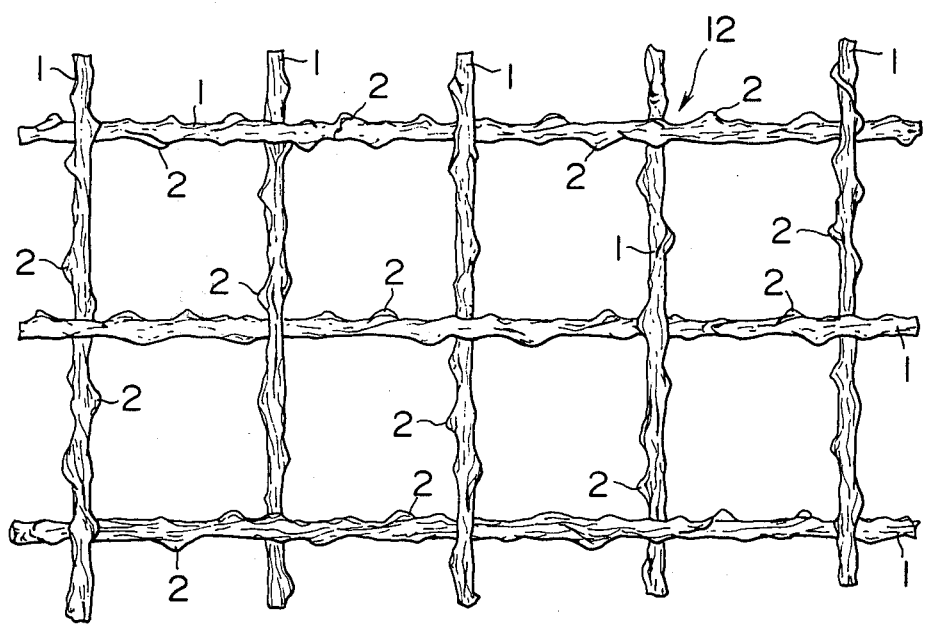
FIG. 22 is a perspective view illustrating a net fragment (web) of the reinforcing material.
Figure 23:
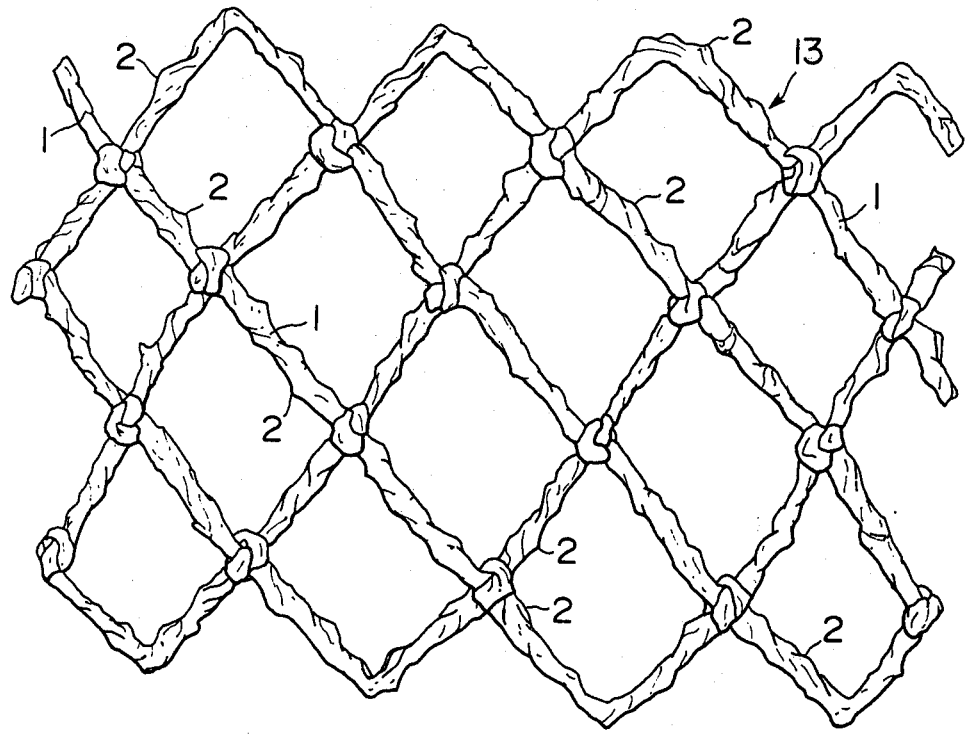
FIG. 23 is a perspective view illustrating a modification of the net fragment (knitting).

The reinforcing material 1 is cut into short stems or strings, or it is twisted, woven or knitted to form twisted strings or nets, before use. FIG. 20 shows a short term fragment 10 obtained by cutting the reinforcing material 1 into a length of 40 mm. FIG. 21 shows a twisted string fragment 11 obtained by twisting a plurality of the reinforcing materials 1. FIG. 22 shows a net fragement 12 formed by weaving the reinforcing materials 1. FIG. 23 shows a modification of the net fragement 12 which is obtained by knitting the reinforcing materials into a knot net structure to form a net fragment 13.

The reinforcing material in the form of short stem fragments may be admixed with concrete or mortar in an ordinary mixer. The mixture is then framed, cast or sprayed to solidify.

It has been found from the experimental results that the concrete solidified product with the reinforcing material of the invention incorporated therein has a remarkably improved bending strength as compared with a similar concrete product without reinforcing material or with a reinforcing material having no protrusions. The product with the reinforcing material of the present invention has a bending strength three times greater than the same product without the reinforcing material.

Figure 24:
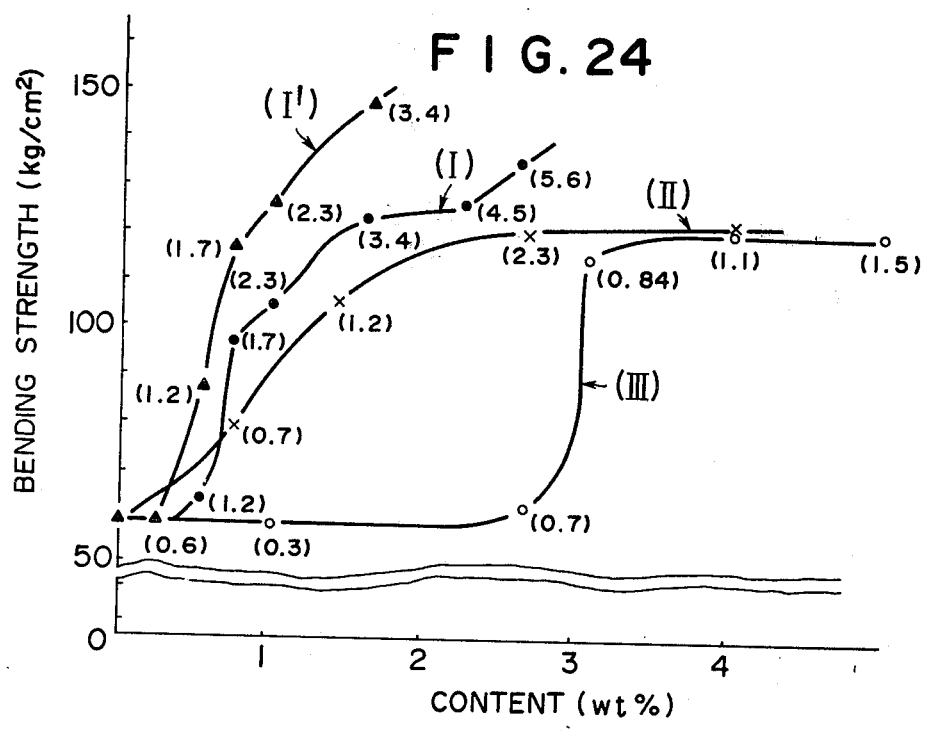
FIG. 24 is a graph showing the relation of the bending strength of the concrete material vs amount of the reinforcing material in concrete material.

In FIG. 24, the bending strength of a mortar product solidified with the short stem fragments incorporated therein is compared with that of a similar product with use of other reinforcing material such as steel fibers or glass fibers. In FIG. 24, I indicates the measured values with respect to the product with the reinforcing material of short stem fragments 10 having a length of 40 mm incorporated therein vs the amount (% by weight) of reinforcing material; I' indicates the measured values with respect to the product with the reinforcing material of short stem fragments 10 having a length of 60 mm incorporated therein; II indicates the measured values with respect to a similar product with alkali glass fibers in the form of chopped strands of a length of 25 mm incorporated therein and III indicates the measured values with respect to a similar product with steel fibers (0.5×0.5×30 mm) incorporated therein. The numbers in the brackets for the respective measured values indicate the respective contents (% by volume).

Figure 25:
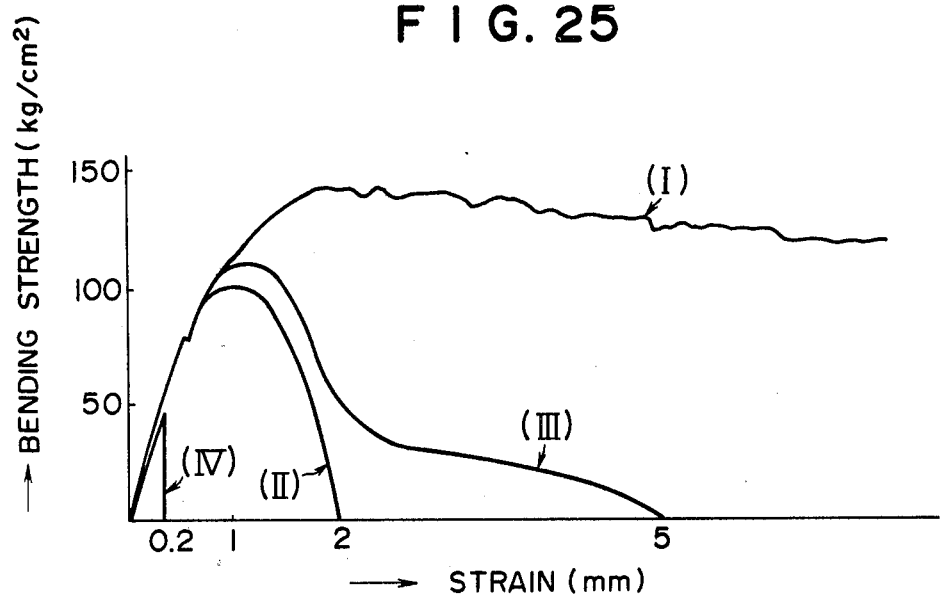
FIG. 25 is a graph showing the relation of the bending strength of the concrete material vs strain material.

FIG. 25 shows bending strength-strain curves, whereby the product with the short stem fragments 10 incorporated therein is compared with other products. In FIG. 25, I indicates the measured values with respect to the product with the reinforcing material incorporated therein, and II and III, respectively, indicate the measured values for the product having glass fibers incorporated therein and the measured values for the product with steel fibers incorporated therein. IV indicates the measured values for the product with no incorporation of fibers.

It is apparent from FIG. 25 that as compared with other products, the solidified product such as a concrete product having the reinforcing material of the present invention incorporated therein maintains the strength much better than other products when the strain increases, and is proved to have a greater energy absorption capacity, and thus it is highly effective for preventing the falling off of concrete fragments from a reinforced concrete, for preventing the cracking of a concrete road by heavy vehicles, or for preventing the falling off of rocks from a tunnel due to cracks in the concrete layer or the closing of the tunnel.

FIGS. 26 to 33 show various uses of the short stem fragments 10, twisted string fragments 11 and net fragments 12 and 13.

Figure 26:
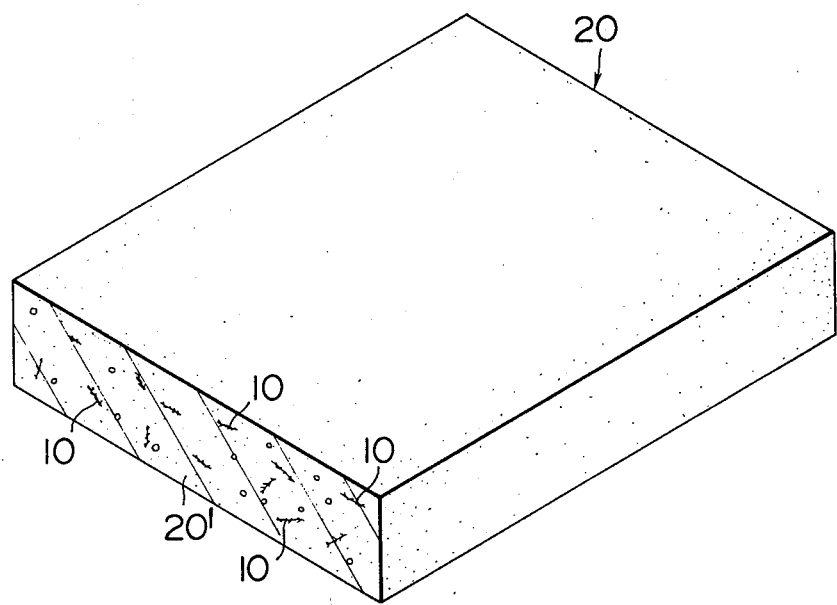
FIGS. 26 to 32 are partial cross sectional perspective views of various concrete products with the reinforcing material of the invention incorporated therein.

FIG. 26 shows a concrete panel 20 having the short stem fragments 10 incorporated therein. In the Fig., 20' is a concrete layer in which a proper amount of the short stem fragments 10 are uniformly distributed. The concrete panel 20 may be used for a floor or wall as pre-cast board.

Figure 27:
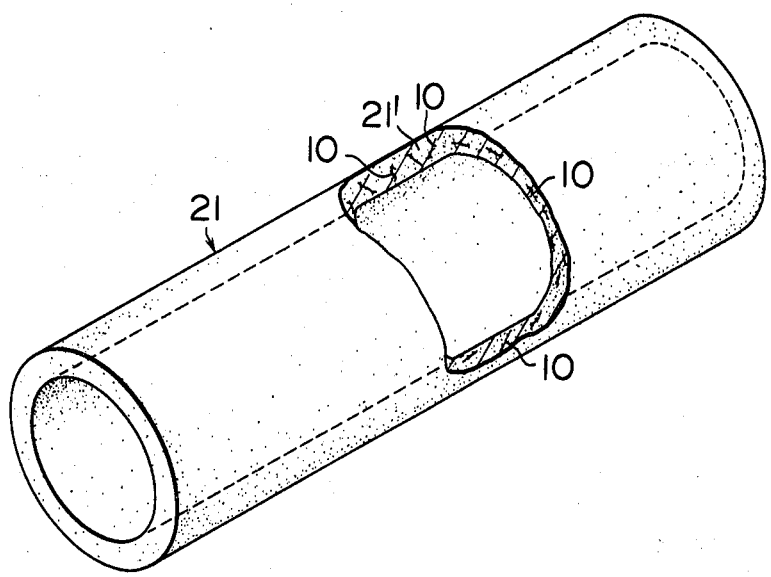

FIG. 27 shows Hume (trademark) concrete pipe 21. In the Fig., 21 indicates a concrete layer in which a proper amount of the short stem fragments are incorporated.

Figure 28:
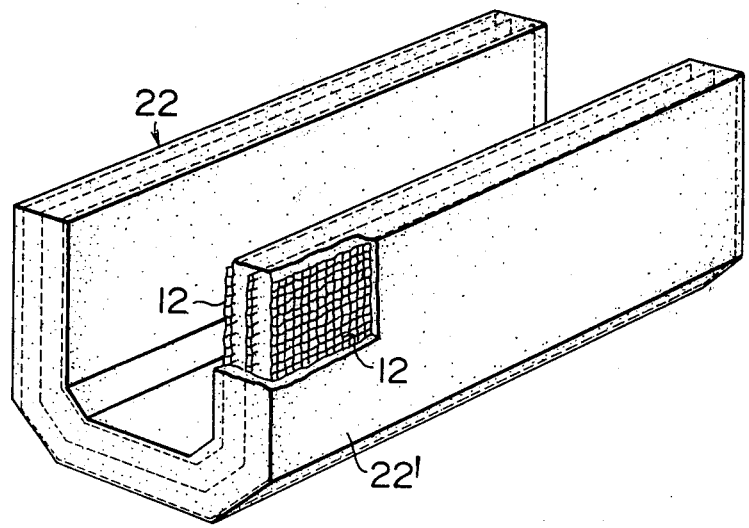

FIG. 28 shows a U-shaped concrete channel 22 with the net fragments incorporated therein. The concrete channel 22 is prepared by presetting the net fragments 12 within and along the mold frames and then pouring concrete material in the frames so that the net fragments 12 are embedded in a concrete layer 22'.

Figure 29:
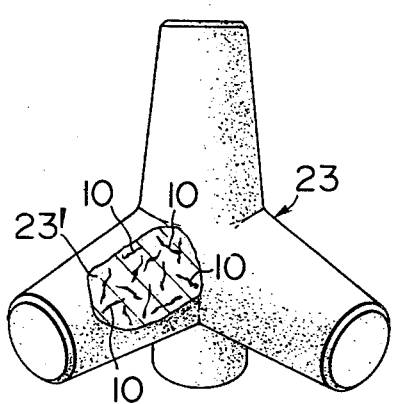

FIG. 29 shows a tetrapod which is a type of block for preventing waves, wherein a proper amount of the short stem fragments 10 is incorporated in the concrete layer 23'.

Figure 30:
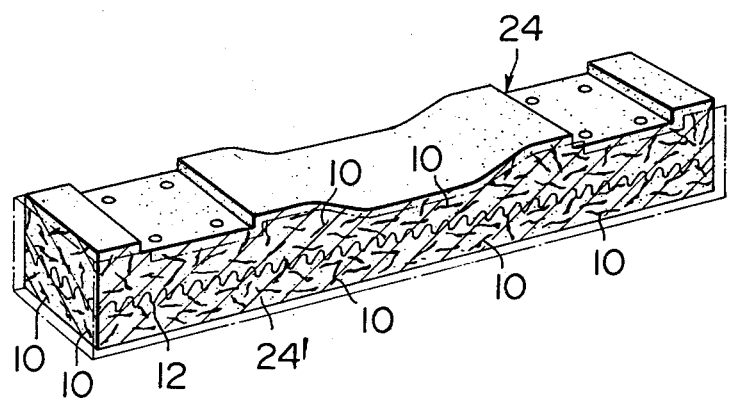

FIG. 30 shows a sleeper 24 for railways, wherein the short stem fragments 10 and the net fragment 12 are incorporated. The sleeper 24 is prepared by first setting the net fragment within and along the mold frames, and then pouring into the frames a concrete material admixed with a proper amount of the short stem fragments so that the net fragment 12 is embedded in the concrete layer 24'.

Figure 31:
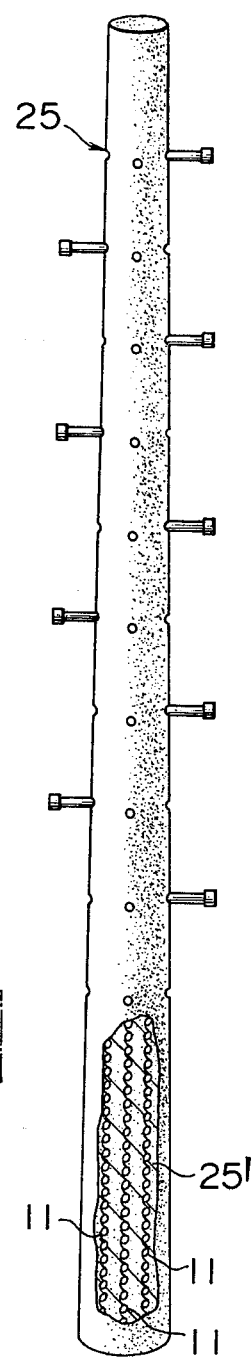

FIG. 31 shows an utility pole, wherein twisted string fragments 11 are incorporated in the concrete layer 25'.

Figure 32:
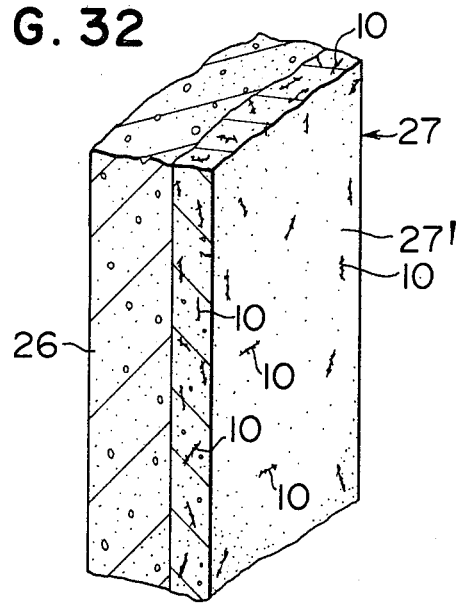

FIG. 32 shows a wall structure for construction purpose, wherein 26 is a concrete wall and 27 is a surface wall consisting of mortar material. In the surface wall 27, a proper amount of the short stem fragments 10 is incorporated in the mortar layer 27'. The short stem fragments 10 may be coloured and exposed on the surface wall 27.

Figure 33:
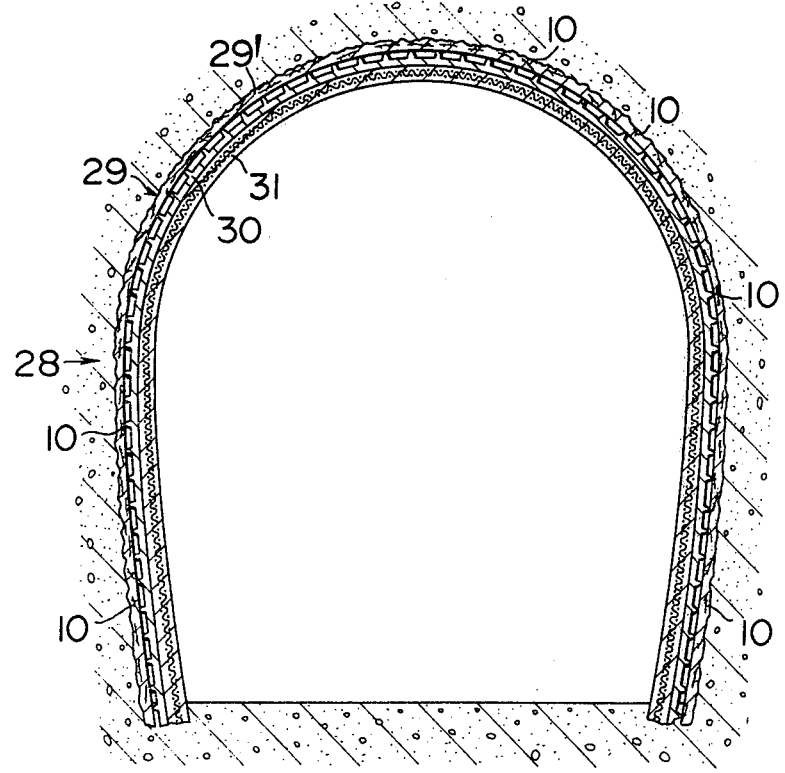
FIG. 33 is a cross sectional view of a tunnel structure.

FIG. 33 shows a tunnel structure installed in the earth 28, wherein 29 is a first lining covering the tunnel surface, 30 is a waterproofing sheet of synthetic resin, and 31 is a second lining. The first lining is formed by spraying concrete to provide a concrete thickness of about 20 mm, in which the concrete material is combined with a proper amount of the short stem fragments 10 before spraying it over the tunnel surface. The tunnel structure thereby will have improved crack-proofing and waterproofing properties and thus the falling off of rocks from the tunnel wall due to cracks in the concrete layer is prevented.

What is claimed is:

1. Reinforcing material for hydraulic substances, which consists essentially of an elongated, stretched product of a synthetic resin, the product having a thickness of 3000 denier to 12,000 denier and having discontinuous protrusions over its entire length, the height of the protrusions being not less than 0.1 mm.

2. The reinforcing material according to claim 1, wherein the synthetic resin is a polyolefin or a resin containing a polyolefin as a major constituent.

3. The reinforcing material according to claim 2, wherein the polyolefin is polyethylene having a melt index (as measured by ASTM D1238-65T at 190° C. under the load of 2.16 Kg, unit g/10 min.) of 0.01 to 10.

4. The reinforcing material according to claim 2, wherein the polyolefin is polyethylene having a density (as measured by ASTM D1505-63T) of from 0.930 to 0.980 (g/cc).

5. The reinforcing material according to claims 3 or 1, wherein the polyethylene is a mixture of polyethylene having a melt index of more than 0.01 and not more than 1.0 and from about 30% to about 70% by weight polyethylene having a melt index of not more than 0.01.

6. The reinforcing material according to claim 2, wherein the synthetic resin comprises a polyolefin and a thermosetting resin.

7. The reinforcing material according to claim 6, wherein the thermosetting resin is an epoxy resin.

8. The reinforcing material according to claims 6 or 7, wherein the epoxy resin constitutes from 0.1 to 50% by weight of the synthetic resin.

9. The reinforcing material according to claims 6 or 7, wherein the epoxy resin has an epoxy equivalent of 300 to 5,000 and a viscosity at 25° C. of 100 to 15,000 cps.

10. A reinforcing material for hydraulic substances which consists of an elongated, stretched polyethylene product having discontinuous protrusions over its entire length, the polyethylene having a melt index of from 0.01 to 10 and consisting of a mixture of a polyethylene having a melt index of not more than 0.01 and a polyethylene having a melt index of more than 0.01.

11. The reinforcing material according to claim 1 or 10, wherein the elongated product is stretched 3 to 20 times.

12. The reinforcing material according to claims 1 or 10, wherein the elongated product has an initial modulus of elasticity of 150 to 700 Kg/mm$^2$.

13. The reinforcing material according to claims 1 or 10, wherein the elongated product has a length of 5 to 100 mm.

14. The reinforcing material according to claims 1 or 10, wherein a plurality of elongated products are twisted together.

15. The reinforcing material according to claims 1 or 10 wherein the elongated product is woven or knitted into a net.

* * * * *